March 8, 1927.
B. C. ROCKWELL
1,619,989
KNIFE GLUE CLAMP
Filed Oct. 17, 1923    2 Sheets-Sheet 1
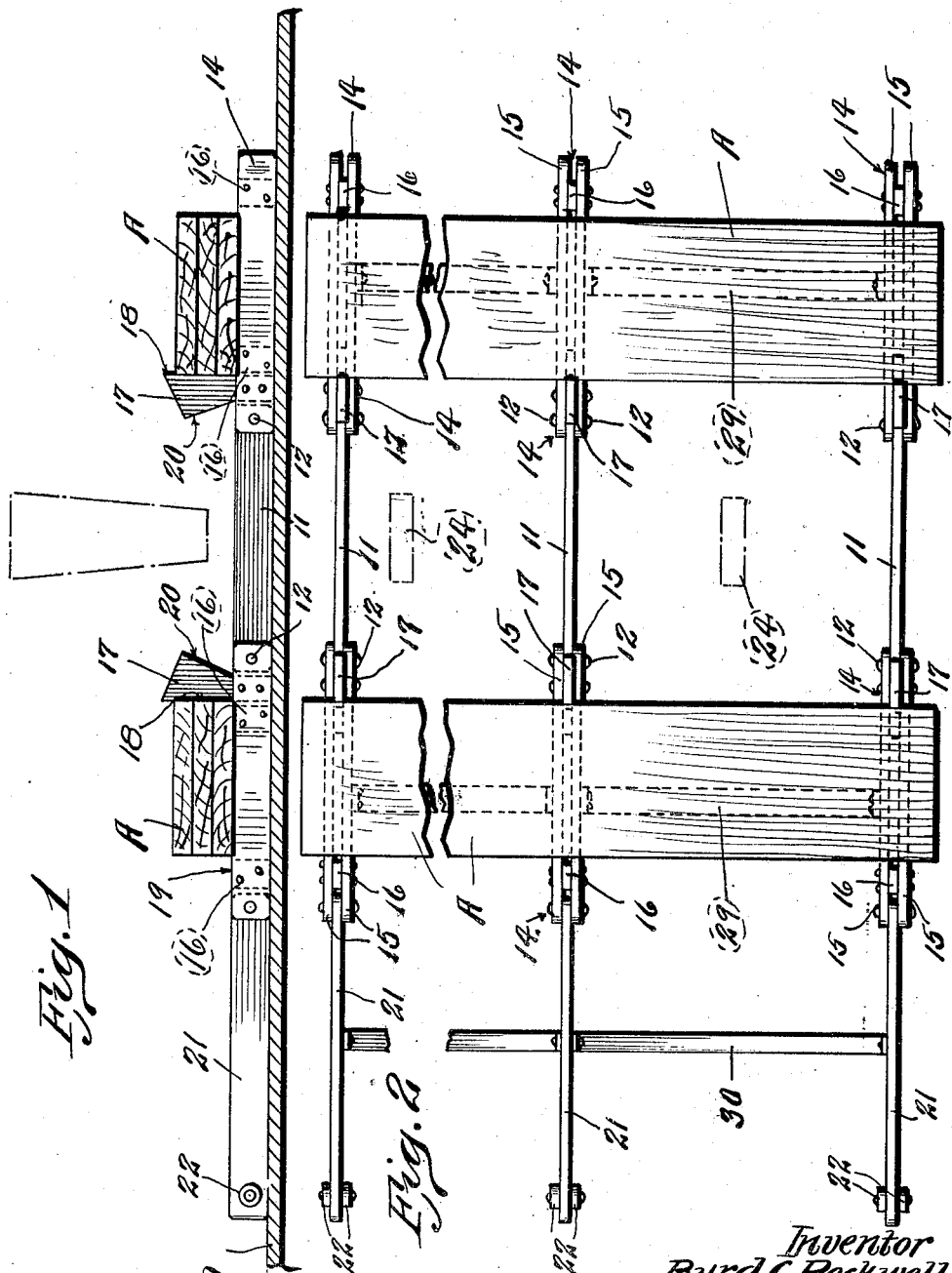
Inventor
Byrd C. Rockwell
By Cornwall, Bedell & Janus
Attys

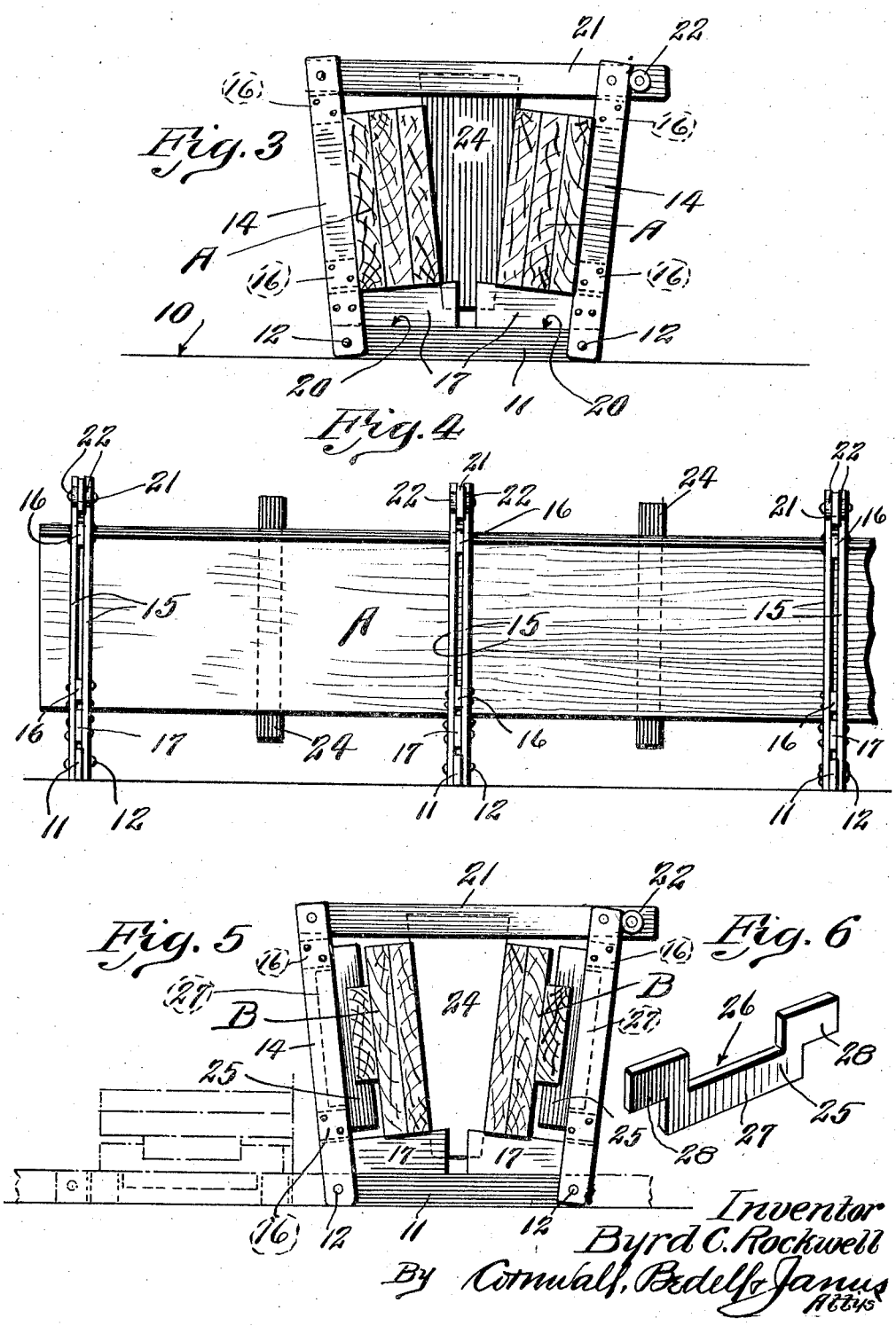

Patented Mar. 8, 1927.

1,619,989

UNITED STATES PATENT OFFICE.

BYRD C. ROCKWELL, OF ST. JOSEPH, MISSOURI.

KNIFE GLUE CLAMP.

Application filed October 17, 1923. Serial No. 669,005.

My invention relates to clamps for lumber and the invention is particularly adapted for use in connection with the manufacture of composite or veneered lumber, such as composite flooring, door jambs, etc., wherein a strip of veneer is applied to a core member by means of a suitable adhesive and the assembled pieces are then placed under pressure while the glue is drying.

The objects of the invention are to provide a simple and efficient clamping device which is strong and durable in construction, can be easily operated, and is inexpensive to manufacture.

Further objects of the invention are to provide a clamp which will hold the lumber pieces in proper relation to each other before and during the gluing operation and to provide a clamp which is self-locking so that when the lumber is placed under pressure the clamp is locked against accidental disengagement.

Still further objects of the invention are to provide a clamp which is adapted to be used in gluing lumber having a face portion of various shapes, suitable holding members shaped to correspond to the contour of various face portions being provided for that purpose and adapted to be detachably inserted in said clamps and used in conjunction therewith.

With these and other objects in view my invention consists in certain novel features of construction and arrangement of parts, hereinafter more fully described and claimed, and illustrated in the accompanying drawings, in which—

Figure 1 is a side elevational view of the clamp showing the same in open or extended position.

Figure 2 is a top plan view of a series of clamps in open positions.

Figure 3 is a side elevational view of a clamp showing the same in interengaged or operative position.

Figure 4 is an end view of a series of closed clamps with the work to be glued in position therein.

Figure 5 is a side elevational view of the clamp equipped with the insertable holding members.

Figure 6 is a perspective detail view of one of the insertable holding members.

The present invention is particularly designed to meet all the contingencies of the glue room in manufacturing veneered or composite lumber. The clamp is provided with posts or abutment members which serve to properly position the lumber during the loading operation and also serve to hold said lumber in alignment and maintain the same in proper position when the clamp is being closed. The insertable members enable the clamp to be used in gluing pieces of lumber of irregular cross section so that square-edge lumber or lumber of various cross sections may be efficiently clamped and placed under pressure during the gluing process.

Referring by numerals to the accompanying drawings, 10 indicates a support which may be a work bench or a support especially built for the clamp and supported on this work bench is a base member or bar 11. Pivotally connected at 12 to the ends of base member 11 are side arms 14 which preferably consist of a pair of bars 15 held in spaced relation by means of spacing blocks 16. Extending upwardly from arms 14 near the pivotal connections 12 thereof are posts or abutment members 17, the edge 18 of which is arranged at right angles to the upwardly presented edges 19 of arms 14. The inwardly inclined edges 20 of posts 17 occupy a predetermined relation to the upwardly presented edge of base member 11 and form stops which, when arms 14 are moved into closed positions, engage the upper edge of base member 11 and determine the angular positions of arms 14.

Pivotally connected to the outer ends of one of the side arms 14 is one end of a top bar 21, the opposite end of which is provided with laterally projecting rollers 22 which, when the side arms are moved into closed position, are adapted to engage the outer edges of the upper ends of the opposite side arm 14 as shown in Figure 3.

A represents the assembled lumber which it is desired to glue together and 24 are the wedge members which, when the clamp is closed, are driven between the lumber pieces A and place the latter under pressure. When one side of the lumber to be glued is formed with angular or irregular cross section such as pieces B shown in Figure 5, insertable face members 25 (Figure 6) are provided and are designed to be inserted in the side arms 14 between the spaced bars 15 and have their outer or work engaging edges shaped so as to conform to the contour of the face of pieces B as indicated at 26 in Figure 6. Members 25 are provided with shanks or extensions 27 which fit in the slots formed by bars 15 and spacers 16 while the ends 28 of members 25 rest against the spacing blocks 16.

When the lumber pieces to be glued are of appreciable length, a series of clamps are used as shown in Figures 2 and 4, and these clamps are preferably interconnected by means of bars 29 which connect the side arms 14 of the respective clamps and bars 30 which connect the top bars of said clamps. Base members 11 may also be connected together so as to maintain them in proper spaced relation or they may be seated in any suitable manner in support 10. Bars 29 and 30 not only hold the clamps in spaced relation but enable the operator to operate all of said clamps simultaneously.

In using the clamp, side arms 14 are moved into open or extended position as shown in Figure 1. The lumber pieces to be glued are then placed in position on said clamp transversely of side arm 14, the lowermost lumber piece resting on the upper edges of side arms 14. Posts 17 engage the inner edges of the assembled lumber pieces and maintain them in proper alignment with each other. Arms 14 are now operated to move inwardly toward each other until the edges 20 of posts 17 come to rest on the upper edge of base member 11. When in this position, side arms 14 and the assembled lumber pieces occupy positions shown in Figure 3, posts or aligning members 17 serving as bottom supports for the lumber.

The top bar 21 is now swung on its pivot so as to bring rollers 22 into engagement with the upper ends of the opposite side arm 14. With rollers 22 occupying this position, said side arms are locked by top bar 21 against disengagement. The wedge members 24 are now driven at suitable intervals in their respective positions between the lumber pieces A and place the latter under pressure. The lumber is then left in the clamp for a suitable length of time until the glue is dry, whereupon the wedge members are forced from their positions and top bar 21 is moved to disengage side arms 14 which are then opened so as to enable the operator to remove the glued lumber. The clamps can be arranged in any desired series in order to accommodate lumber of various lengths, the individual clamps of said series being interconnected so that all of said clamps may be simultaneously operated, either manually or by power-actuated means. If desired, each clamp may be operated independently of the other or they may be operated in proper time relation.

A clamping device of my improved construction is simple and durable, can be easily operated and is inexpensive to manufacture, can be used singly on a work bench for small work, or can be easily arranged in series to be used in gluing lumber of various lengths.

While I have shown and described the preferred form of my invention, it is obvious that various changes in the size and form will suggest themselves to those skilled in the art, and I contemplate all such modifications as fall within the scope of the appended claims.

I claim:

1. A glue clamp comprising a pair of opposed pivotal arms adapted to be moved inwardly toward each other into cooperative interengaged relation, said arms being provided with seats for receiving and positioning the work to be glued, and removable blocks adapted to be driven into engagement with the work for placing the latter under pressure.

2. A glue clamp comprising a pair of opposed pivotal arms adapted to be moved inwardly toward each other for bringing the work in operative position, said arms being provided with seats for receiving and positioning the work to be glued, removable blocks adapted to be driven into engagement with the work for placing the latter under pressure, and means for engaging the free ends of said arms and securing the latter in their cooperative relation.

3. A clamp for lumber comprising a pair of opposed bars pivotally supported at one of their ends and movable upwardly toward each other to receive and maintain in proper positions the lumber to be glued, a cross member for engaging the free ends of said bars and retaining the latter in closed position, and wedge members adapted to be driven in engaging position with said lumber whereby the latter is placed under pressure.

4. A clamp comprising a stationary base, a pair of opposed arms hinged to said base, abutment members projecting transversely and upwardly from said arms and adapted to engage in cooperation with said arms the work to be clamped, said arms being movable upwardly into cooperative relation, and a member pivotally secured to one arm and adapted to engage the opposite arm for locking said arms together.

5. A clamp comprising a stationary base, a pair of opposed arms hinged to said base, abutment members projecting from said arms and adapted to engage in cooperation with said arms the work to be clamped, said arms being movable upwardly into cooperative relation, a member pivotally secured to one arm and adapted to engage the opposite arm for locking said arms together, and removable wedge blocks adapted to be driven into engagement with the work for placing the latter under pressure.

6. A clamp comprising a stationary base, a pair of opposed arms pivotally secured to said base and operable to position the work, a member adapted to be detachably seated in each arm and having its work engaging edge shaped to conform to the contour of the face of the work, said arms being adapted to be operated to bring said work in pressure applying positions, and wedge members adapted to engage said work and place it under pressure.

7. In a clamp of the class described, the combination with a pair of opposed arms movable into cooperative work retaining relation, of members adapted to be detachably seated in each arm to form work receiving seats, said members being formed so as to conform to the cross section of the face of the corresponding work, and wedge members adapted to be driven into pressure applying engagement with said work.

8. A glue clamp comprising a base member, a pair of opposed bars pivotally mounted thereon and movable into upright positions for receiving therebetween the work to be glued, means for interlocking the upper ends of said bars to prevent displacement thereof, and means adapted to hold said work under pressure against said bars.

9. A clamp comprising a base member, a pair of opposed bars pivotally mounted at their lower ends to said base member and movable relative thereto to receive the work to be clamped, a member for engaging the upper ends of said bars and lock the latter in work-receiving position, and a removable member adapted to engage said work and hold it in pressure engagement with said bars.

10. A clamp of the class described comprising a base member, a pair of opposed bars pivotally mounted at their lower ends at spaced points to said base member and movable into upright positions for receiving the work, abutment members projecting angularly from said bars for supporting said work, a member for engaging the upper ends of said bars and locking the latter in receiving position, and a wedge member adapted to be driven into engagement with said work and place the latter under pressure while in said clamp.

In testimony whereof I hereunto affix my signature this 10th day of October, 1923.

BYRD C. ROCKWELL.